Dec. 30, 1952  J. HENCHERT  2,623,274
BAIL INSERTING MACHINE
Filed Oct. 2, 1950  10 Sheets-Sheet 4

INVENTOR.
John Henchert
BY
Mason, Porter, Diller & Stewart
Attys

INVENTOR.
John Henchert
BY
Mason, Porter, Diller & Stewart
Att'ys

Dec. 30, 1952 J. HENCHERT 2,623,274
BAIL INSERTING MACHINE
Filed Oct. 2, 1950 10 Sheets-Sheet 7

INVENTOR.
John Henchert

Dec. 30, 1952 J. HENCHERT 2,623,274
BAIL INSERTING MACHINE
Filed Oct. 2, 1950 10 Sheets-Sheet 8

INVENTOR.
John Henchert
BY
Mason, Porter, Diller & Stewart
Attys

INVENTOR.
John Henchert

Patented Dec. 30, 1952

2,623,274

UNITED STATES PATENT OFFICE 2,623,274

BAIL INSERTING MACHINE

John Henchert, River Forest, Ill., assignor to Continental Can Company, Inc., New York, N. Y., a corporation of New York Application October 2, 1950, Serial No. 188,012

17 Claims. (Cl. 29—211)

1

The invention relates to new and useful improvements in a machine for inserting bails in can ears and more particularly a bail having the end portions lying within the ears bent in opposite directions relative to the plane of the bail for preventing the bail ends from becoming detached from the ears.

An object of the invention is to provide a machine adapted to position a bail relative to the can ears so that the bent end of one end of the bail is in alignment with the opening in an ear while the other end is positioned remotely from its ear and then, after the positioned bail end has been moved into its ear, shifting said bail bodily and twisting the bail portion to move the other end into alignment with its ear and releasing the bail so that the end will snap into the ear.

A further object of the invention is to provide a machine of the above type with devices for feeding cans one after another to a bail attaching station where the can is supported by its ears in an upright position.

A further object of the invention is to provide a machine of the above type with means whereby the cans are received at random and are rotated so as to bring the ears into horizontal alignment at the bail attaching station.

Another object of the invention is to provide a machine of the above type with a bail supporting magazine and devices associated therewith so that when the can is raised to bail attaching position a bail is released and moved into its initial position relative to the can ears.

A still further object of the invention is to provide gripping jaws for receiving the remotely placed bail end for moving the bent end thereof into alignment with the ear by twisting of the bail and then releasing the bail end to permit the bent end to snap into the ear.

A still further object of the invention is to provide a machine of the above type wherein several independent units operated by fluid pressure are synchronized by control cams for feeding the cans, releasing the bails and inserting one end in the ear and thereafter the other end in its ear after which the can is released.

These and other objects will in part be obvious and will in part be hereinafter more fully disclosed.

In the drawings, which show by way of illustration one embodiment of the invention:

Figure 2 is an enlarged top plan view of the

2 mechanism for manipulating the bail, said view being taken on the line 2—2 of Figure 7;

Figure 7 is a vertical longitudinal section taken centrally through the machine;

Figure 27 is a diagrammatic view showing the solenoids for controlling valves associated with the fluid operated units and the control cams for synchronizing the operation of the various units;

The invention has to do with a machine for inserting bails in the ears of cans. The bail is of the type wherein the end portions are preformed prior to attachment to the can ears so as to provide end portions extending at an angle and in opposite directions relative to the plane of the bail. The can ears are of the usual type.

The machine includes a series of units synchronized by control cams for feeding cans one after another to a bail attaching station and delivering a bail to said station. The cans at said station are supported solely by the ears thereof. Operating units are provided for aligning and inserting one of the bent ends of a bail in an ear while the other end of the bail is remotely disposed relative to the other ear. Operating units are also provided for gripping the remotely positioned end of the bail for shifting and twisting the bail end until the bent end thereof is brought into alignment with the other ear and then entering the bent end and releasing the bail so that the bent end snaps into locking position within the ear. This shifting of the bail positions the first named bent end on the bail so that the bail is locked to the first named ear.

The can with the bail attached thereto is released and is fed by gravity from the machine. Another cycle is then initiated and another can and bail are presented to the bail attaching station for having the bail attached to the can.

As shown in the present illustrated embodiment the machine includes a more or less skeleton framework for supporting the several units of the machine and the devices for operating the same. Mounted in the framework is the can chute 10 having a bottom member 11 and side members 12, 12 for guiding the can. The can bodies with the ears attached are delivered into this chute 10 from a gravity runway including spaced angle bars 13, 13.

Figure 1:
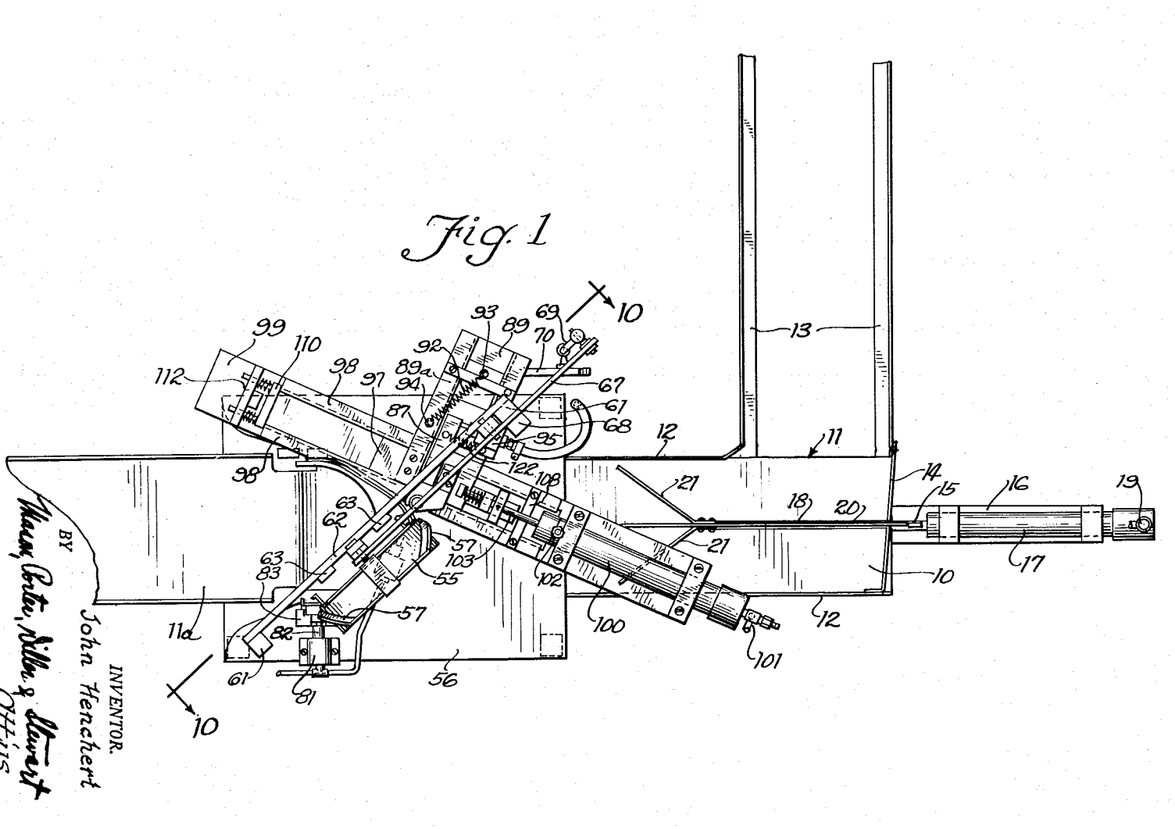
Figure 1 is a top plan view of the machine embodying the improvements.

The can bodies which are indicated at C roll down along the gravity runway and are delivered into the chute 10 at the receiving end thereof. This receiving end is closed by an end plate 14 and the side plate 12 of the chute is cut away or shortened as indicated in Figure 1 so as to permit the can bodies to roll from the gravity runway onto the bottom plate of the can chute 10. The can bodies are fed along the chute by a feed dog 15. Mounted on a supporting plate 16 attached to the can chute and extending therefrom is a cylinder 17 containing a piston and a piston rod which reciprocates in the cylinder and this feed dog 15 is mounted on the piston rod so that it may yield vertically. In raised position it moves along the slot 18 in the bottom member 11 of the can chute and engages the cans and moves endwise from station to station along said chute. When the piston rod is retracted the dog will yield and pass beneath the can bodies. The cylinder is supplied with a fluid, preferably air under pressure, through a valve 19 which may be adjusted to regulate the flow of the fluid and the speed of the movements of the feed dog.

The can bodies have their ears attached thereto as indicated in dotted lines in Figure 7 of the drawings. The end plate 14 of the chute is set at a slightly obtuse angle to the longitudinal axis of the can feed chute so that the can when fully delivered to the can feed chute will be moved endwise so as to avoid the ear on the can from engaging the ear of the following can in the gravity runway. Fixed to the framework at the upper side of the path of travel of the can bodies is a bar 20. This bar extends all the way to the receiving end of the can feed chute. If the ear of the can passing into the chute happens to be on the upper side thereof it will contact with this bar 20 and as it passes along the bar 20 it will engage one of the arms 21, 21 which are carried by the bar 20. These arms are inclined away from the bar 20 and the ear contacting therewith will cause the can to rotate so as to position the ear at the other side of the can for contacting with one of the other of the guide rails 22, 22 and this will further rotate the can due to the shaping of these guide rails so as to position the ears of the can body in horizontal alignment.

The stroke of the feed dog is slightly greater than the length of the can body and when the can body is moved from the receiving position as shown in Figure 7 to the next idle position the can bodies will be spaced from each other slightly. The moving of the can body to this second position will advance the can body in front thereof to the third position as shown in this Figure 7. In order to prevent an overfeed of the can bodies a stop 23 is provided. This stop is mounted for vertical movement on a bracket 24 carried by the bottom plate 11 of the can feed chute. The piston rod of the cylinder 17 is provided with an extension 25 to which is attached a plate 26 having a cam shoulder 27. This plate passes through a slot in the bracket 24 and when the feed dog moves forward to feed a can body one step along the feed chute the stop is raised so that the advanced end of the can body indicated at $C^1$ contacts the stop and this limits the movement of the cans as the piston rod is fluid pressure actuated. The stop is carried at the end of a pivoted arm and when released will drop into inoperative position. Mounted on the frame is a hinge plate 28 which contacts the can $C^1$ and prevents the can in its advance to this station position from jumping the stop 23.

The guide rails 22, 22 are inclined upwardly until a peak point 29 is reached. At this time the rails are engaging both ears of the can and the rails are so dimensioned that the can at the advanced end is lifted slightly as shown in Figure 7. From this peak point 29 the surface of the guide rails 22, 22 engaging the ears inclines downwardly as indicated at 30. There is a short rail 31⁰ above the portion 30 of each guide rail 22 and this aids in directing the ears of the can body downward along the inclined edges of the guide rails.

At the end of the guide rails 22, 22 are vertically movable slides 31, 31ᵃ and each slide is provided with an ear receiving pocket 32. The ears of the can bodies, as they slide down the inclined portions 30 drop into these pockets 32, 32.

Mounted in suitable bearings on the frame is a shaft 33. Fixed to the shaft 33 is an arm 34 and a link 35 is pivoted to this arm 34 and also pivoted to the slide 31. There is a similar arm 36 connected to the other end of the shaft 33 and this arm is connected to a link 37 which in turn is connected to the slide 31ᵃ having a pocket 32 which engages the other ear of the can body. When these slides 31 and 31ᵃ are raised they lift the ears of the can body and the can body will be drawn along the bottom of the chute and finally lifted to a position where it will swing to an upright or vertical position as shown in dotted lines at C². These slides 31 and 31ᵃ are supported and slide on vertically arranged standards 38, 38. There is a bracket 85 at one side of the machine having a pocket 40, and a bracket 73 at the other side of the machine having a similar pocket 40. The ears are lifted into engagement with these pockets and thus a can is supported by the ears and the ears positioned to receive a bail. The slides each have lugs 32ᵃ to prevent the ears from overshooting the pockets and also shoulders 32ᵇ which engage similar shoulders on the brackets carrying the upper pockets. The upper and lower pockets enclose the ears and position the openings in the ears for the reception of the bail ends.

Figure 8:
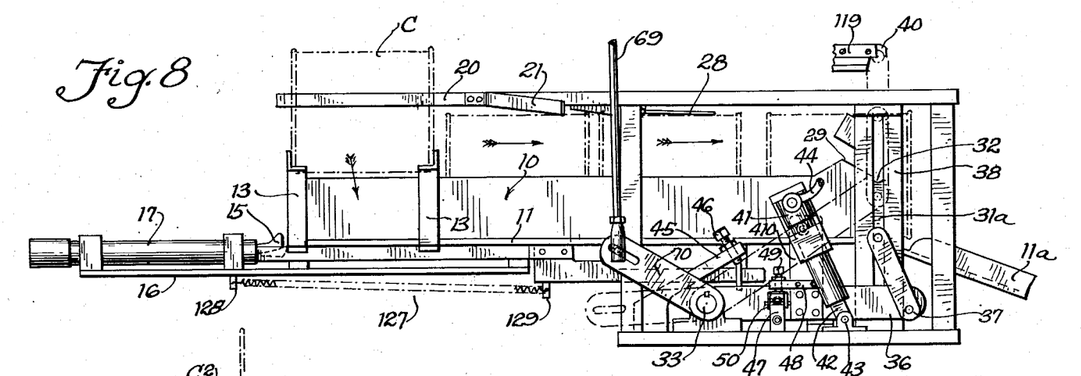
Figure 8 is a side elevation of the can feeding portion taken from the can receiving side of the machine.
Figure 9:
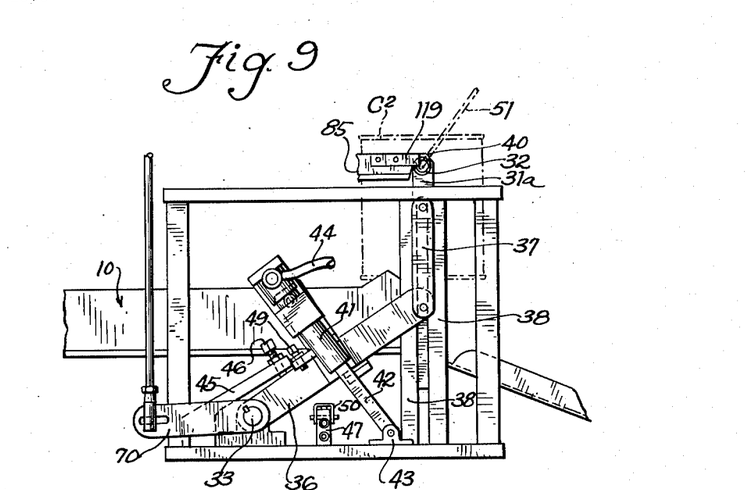
Figure 9 is a view in side elevation of the can elevating devices with the can indicated in dotted lines as supported thereby in raised position.

The shaft 33 is oscillated by a cylinder 41 pivotally attached to a member 410 which in turn is bolted to the arm 36. This cylinder contains a piston and a piston rod 42, and the piston rod 42 is pivotally attached to a bracket 43. When fluid under pressure is delivered to this cylinder from the hose 44 the cylinder will be bodily moved outward on the piston and this will shift the link 36 from the position shown in full lines of Figure 8 to the position shown in broken lines in said figure and to the full line position shown in Figure 9. There is a fixed bracket arm 45 at each side of the machine and each bracket arm carries an adjustable stop screw 46 that contacts respectively with the arms 34 and 36.

When fluid under pressure is admitted to the cylinder 41 the arms 34 and 36 will swing upwardly and lift the can into bail attaching position. After the bail has been attached then the fluid pressure is cut off and these arms are returned to their initial position shown in Figure 8. There is a valve 47 for controlling the flow of fluid under pressure to the cylinder 17 which operates the feed dog. This valve is shifted to open position by an arm 48 carrying an adjustable screw 49 which contacts with a yoke 50 for opening the valve. When the can is lowered for discharge from the machine this arm 36, when it reaches its initial position, will cause the valve 47 to be opened and fluid will flow to cylinder 17 and the feed dog 15 will be actuated for feeding another can to the bail attaching station.

Figure 10:
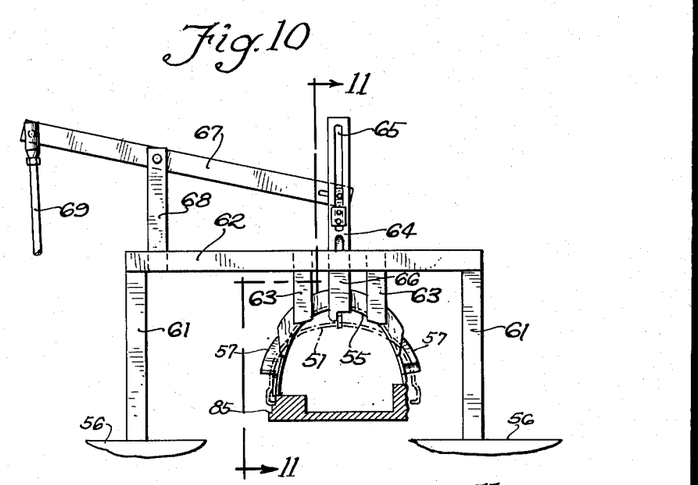
Figure 10 is a view partly in section and partly in elevation of the bail feeding mechanism as viewed from the discharge end of the machine.
Figure 11:
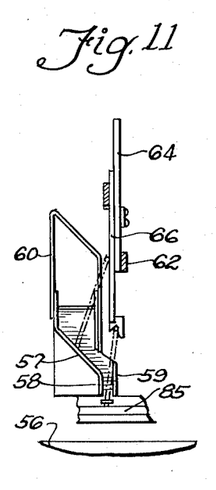
Figure 11 is a view on the line 11—11 of Figure 10.
Figure 12:
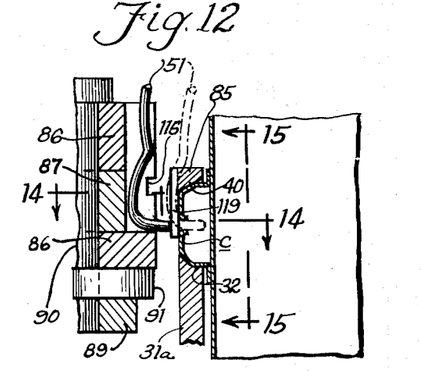
Figure 12 is a vertical sectional detail of the bail gripping and swinging element at the position for inserting the left hand end of the bail in its ear as viewed from the discharge end of the machine.
Figure 13:
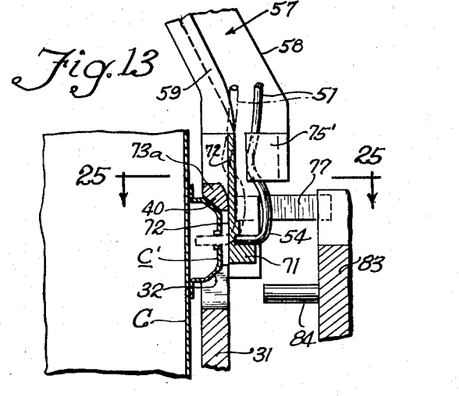
Figure 13 is a vertical sectional detail of the bail inserting elements at the position for inserting the right hand end of the bail.
Figure 14:
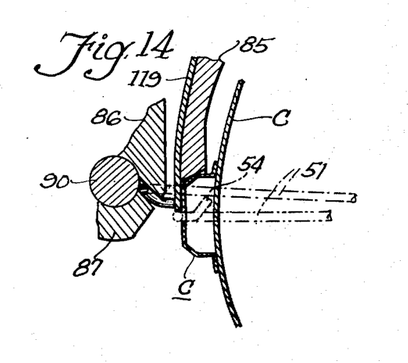
Figure 14 is a horizontal section on the line 14—14 of Figure 12.
Figure 15:
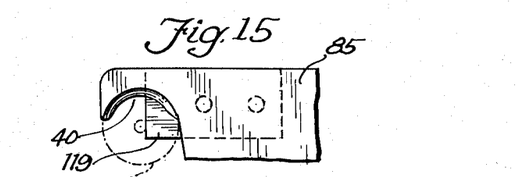
Figure 15 is a side elevation of the bracket for positioning the can ear, said view being taken along the line 15—15 of Figure 12 with the can body omitted and the ear indicated by broken lines.
Figures 17, 18:
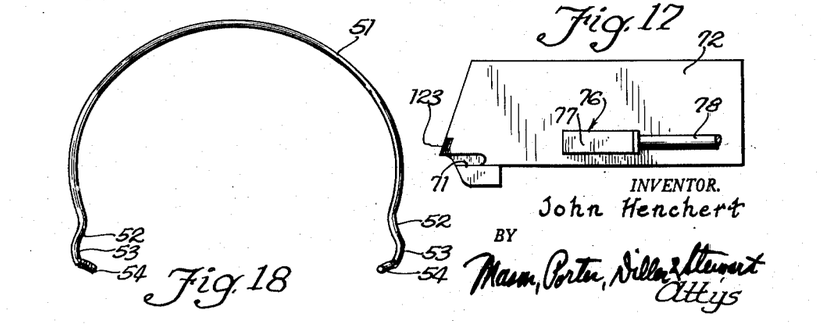
Figure 17 is a side elevation of the sliding plate which positions the bail end and then releases it for insertion in the ear.
Figure 18 is a view of the bail preformed and ready for attachment to the can ears.
Figure 20:
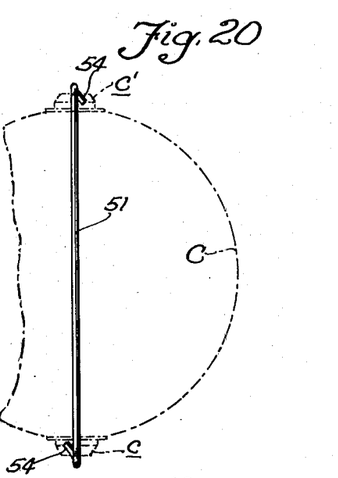
Figure 20 is a view showing a can and ears in broken lines and a bail attached to the ears.
Figure 21:
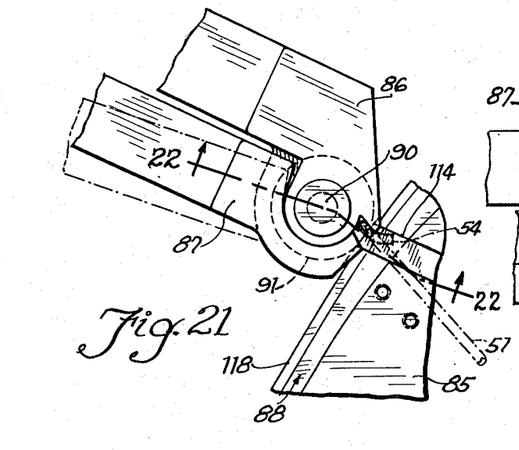
Figure 21 is a fragmentary plan view showing the jaws and the left hand end of the bail positioned between the jaws ready for gripping the same.

The bail which is to be attached to the can is shown in Figure 18. It is preformed so as to have a main arched portion 51 and each end of the bail is bent outwardly as indicated at 52; thence downwardly at 53 and thence inwardly and the inner end portion 54 is bent so as to lie at an angle to the plane of the bail. The end portions are similarly shaped except that the bent ends 54 extend in opposite directions. The purpose of these bent ends is to lock the bail to the container as shown in Figure 20. These bails are stacked in a magazine which is illustrated more or less diagrammatically in Figure 10. The magazine includes an arched portion 55 which is mounted on the frame member 56. See Figure 1. There is a guiding flange 57 at each side of the arched portion which inclines from rear toward the front of the magazine. This guiding flange 57 terminates in a vertical flange 58 and associated with this vertical flange 58 is a front flange 59, which is spaced therefrom so that a bail end may pass down through the channel between these flanges 58 and 59. There is a central supporting frame 60 and the bails are placed in the magazine so that the ends thereof which are initially so spaced that the contraction of the bail ends would cause the same to grip the arched portion of the magazine and retain the bails until they are forcibly delivered from the magazine.

Figure 19:
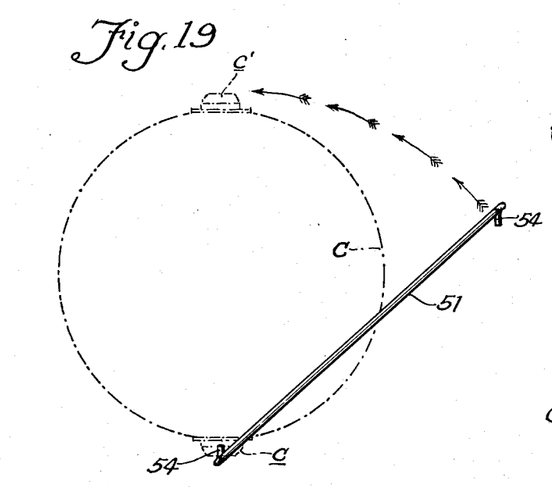
Figure 19 is a view showing diagrammatically the position of the bail when the right hand end is inserted in the ear and indicating by the arrows the shifting of the bail to a position for entering the bent end thereof into the left hand ear.

Mounted on the frame of the machine are uprights 61, 61 carrying a cross bar 62. This cross bar has depending guide members 63, 63 which engage the arched portion of the bail and guide the same as it is delivered from the magazine. Also mounted on the cross bar 62 is a standard 64 having a longitudinal slot 65 therein. A slide 66 is connected to this standard so that it may move longitudinally thereof. The slide is connected to a lever 67 mounted on a standard 68. One end of a rod 69 is connected to the lever 67 and the other end of this rod is connected to an arm 70 which arm is fixed to the shaft 33. After a bail has been attached to a can then the shaft 33 is oscillated in a clockwise direction and the arms 34 and 36 move downward to the full line position shown in Figure 8 and the can with the bail attached is discharged from the machine. This opens the valve 47 so that another can is fed forward into the pockets of the slides ready to be lifted to bail attaching position. At the same time the arm 70 moves upwardly in a clockwise direction, then this will raise the rod 69 and swing the lever 67 so as to cause the slide 66 to engage the advanced bail in the magazine and strip it from the magazine, moving it down into initial position for the bail attaching operation. The front end of the magazine holding the bails lies in a plane which cuts a vertical plane passing through the ears of the can at an acute angle (see Fig. 2). This acute angle is substantially the same as the acute angle of the bent end of the bail relative to the plane of the bail. In describing the attachments of the bails to the ears the ears of the can will be referred to as the right and left-hand ear respectively. This is the position of the ears as viewed from the discharge end of the machine. In Figure 19, the can is indicated by broken lines at C, the right hand ear at c and the left hand ear at c'. The end of the bail which is to be attached to the right hand ear c will pass between the flanges 58 and 59 onto a supporting ledge 71 carried by a slide 72. (See Figs. 16 and 17.)

Figure 16:
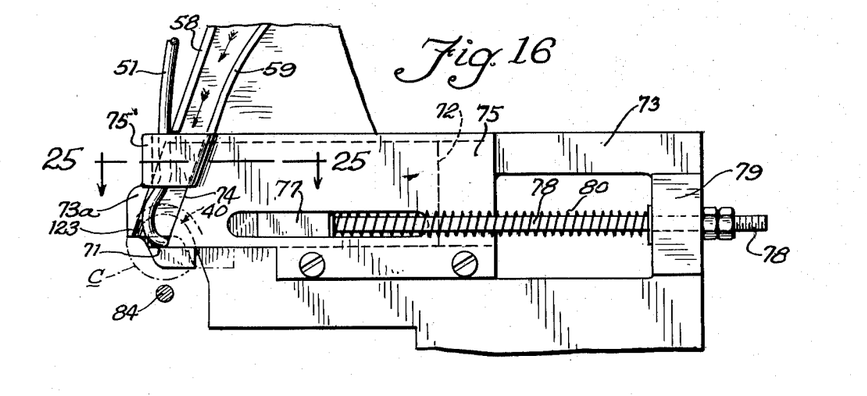
Figure 16 is a side elevation of part of the mechanism for inserting the right hand end of the bail in the ear.

This slide plate 72 is mounted between a supporting bracket 73 and an overlying guide member 75. The front end 74 of this guide member and the ledge 71 of the slide are so positioned that the bent end of the bail will be held centered relative to the ear opening which is indicated in broken lines at *c* (Figure 16). The overlying guide member 75 has an extension 75' which aids in holding the bail in a vertical position and prevents it from swinging forwardly before the ends of the bail are inserted in the ears. This slide 72 is provided with a projecting block 76. The forward face of this block is inclined as indicated at 77 to provide a camming face. The block also carries a rod 78 which is guided in a lug 79 carried by the bracket 73. A spring 80 moves this rod and the slide forward and positions the slide initially so that it lies between the extreme end of the bent end portion and the ear *c* of the can.

Mounted on the frame of the machine is an air cylinder 81 provided with a piston rod 82 which extends into the cylinder and carries a piston head so that when fluid is admitted to the cylinder 81 it will force the piston rod outwardly toward the can. Mounted on the outer end of this piston rod 82 is a pusher head 83. When the bail end is ready for insertion into the ear the fluid is supplied to the cylinder 81 and this moves the pusher head 83 toward the ear. As the pusher head advances it engages the cam face 77 of the block 76 and withdraws the slide 72 from in front of the end of the bail. Further forward movement of the pusher 83 will force the bail end portion into the ear and the movement of the bail into the ear is limited by the bail end contacting the can within the ear. The pusher head carries a pin 84 and as the pusher head terminates its advance movement the pin 84 engages the can below the ear to force the can to the extreme left position. The bail end is now positioned in this right hand ear in the manner shown in Figure 19. The bail is then swung and slightly twisted so as to bring the bent end portion 54 into alignment with the opening in the left hand ear *c'*. During this shifting of the bail the bent end portion within the ear *c* will be turned to a position indicated in Figure 20 and this will lock this end of the bail to the ear so that outward pressure on the bail will not retract the bail end from the ear.

When the bail is released from the magazine and placed in its initial position which has just been described, the remotely positioned bail end will contact the upper face of a guide rail 85 and the bent portion 53 of the bail will be directly opposed to gripping jaws 86 and 87. This guide rail 85 has a step portion 88 on which the bail end portion 54 rests. (See Fig. 22.) These jaws which are to grip the bail are mounted on a slide 89 which in turn is mounted for reciprocation in guiding members 89ª. A pivot pin 90 passes through the jaw 86 which is rigidly mounted on the slide 89. The pin 90 also passes through the movable jaw 87 (see Fig. 22), thence through a roller 91 and into the slide 89. The slide is moved forward so as to bring the roller 91 into contact with the face 118 of the guide rail 85 by means of a spring 92. This spring at its outer end is secured to the slide as indicated at 93 and the other end of the spring is anchored on one of the guiding members 89ª as indicated at 94. Mounted on a bracket carried by the slide 89 is an air cylinder 95 carrying a piston rod 96 attached to a piston head in the cylinder. This piston rod 96 bears against the movable jaw 87 and moves the same so that its gripping face will grip the bail end against the face of the stationary jaw 86.

The guide members 89ª are fixed to a carriage 97 which is mounted for reciprocation in guiding members 98, 98 which guiding members are carried by a stationary portion 99 of the frame. Also mounted on the frame portion 99 is an air cylinder 100. Mounted within the air cylinder 100 is a piston carrying a piston rod 103. There is an attachment 101 by which fluid may be admitted to the cylinder for moving the piston to the left as viewed in Figure 1. There is also an attachment 102 at the other end of the cylinder for admitting fluid under pressure to the other side of the piston for retracting the piston rod.

The piston rod 103 slides freely in a bracket 104 attached to the carriage 97. A spring 105 encircles the end of the piston projecting through the bracket 104. This spring at one end contacts the bracket and at the other end abuts against a collar 106 fixed on the end of the piston rod 103. Also fixed to the piston rod is a collar or disk 107. Extending from one guiding member 98 to the other is a bar 108. A stop screw 109 is threaded into a lug carried by this bar 108. This stop screw is contacted by the lower part of the collar 107 when the carriage is retracted by fluid pressure admitted to the left hand end of the air cylinder 100. The carriage is moved by the piston through the spring 105 and therefore this spring cushions this pulling action of the piston under the influence of the fluid pressure.

The carriage 97 engages a stop bar 110 which is carried by spaced rods 111 mounted for sliding movement in a bar 112 mounted on the stationary frame part supporting the guide members 98, 98. There is a block 113 which limits the movement of this stop bar 110. This whole unit forms a cushion for the carriage 97 when it is moved by the piston rod 103 to the extreme left hand position indicated in Figure 1.

Figure 22:
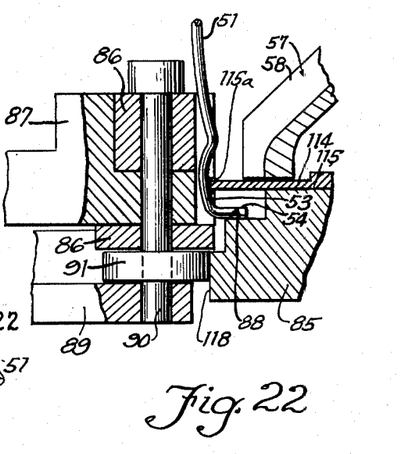
Figure 22 is a vertical sectional view on the line 22—22 of Figure 21.
Figure 29:
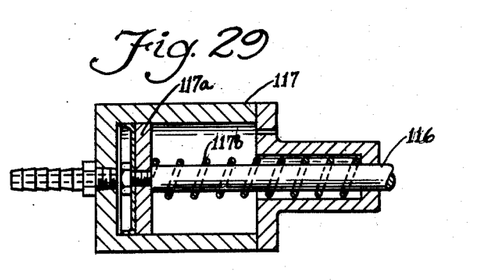
Figure 29 is a longitudinal section of one of the air cylinder units.

When the bail is initially positioned the left hand end portion thereof rests on the step portion 88 and the offset portion of the bail 53 is directly opposite the gripping jaws which are open at this time. In order to seat the portion 53 of the bail between the jaws, a slide 114 is provided which reciprocates in a guiding slot 115 in the guide rail 85. This slide is connected to a piston 116 which slides in an air cylinder 117, as shown in Figure 29. Said piston is connected to a piston head 117ª and when fluid pressure is directed to the cylinder in the rear of the head the piston will be moved forward and the slide brought into contact with the bail and the bail will be pushed between the jaws as shown in Figure 22. Each jaw is provided with a notch 115ª which enables the slide 114 to push the bail well back into the jaws for a firm gripping of the same. This cylinder 117 is provided with the usual spring 117ᵇ for retracting the slide when the fluid pressure is released and the cylinder is vented to the atmosphere. The same is true of the air cylinders 81, 95 and 139. At the same time the air cylinder 81 is provided with fluid under pressure for pushing the bail end into the right hand ear, the piston 117 will be supplied with fluid which pushes the other end portion of the bail between the jaws of the gripping device. When the bail end has been positioned between the jaws then fluid pressure is directed to the cylinder 95 and the movable jaw 87 is moved in a counterclockwise direction as viewed in Figure 2 so as to cause the face of the movable jaw to contact the bail and force it against the stationary jaw so that the bail will be firmly gripped and held from turning.

Figure 2:
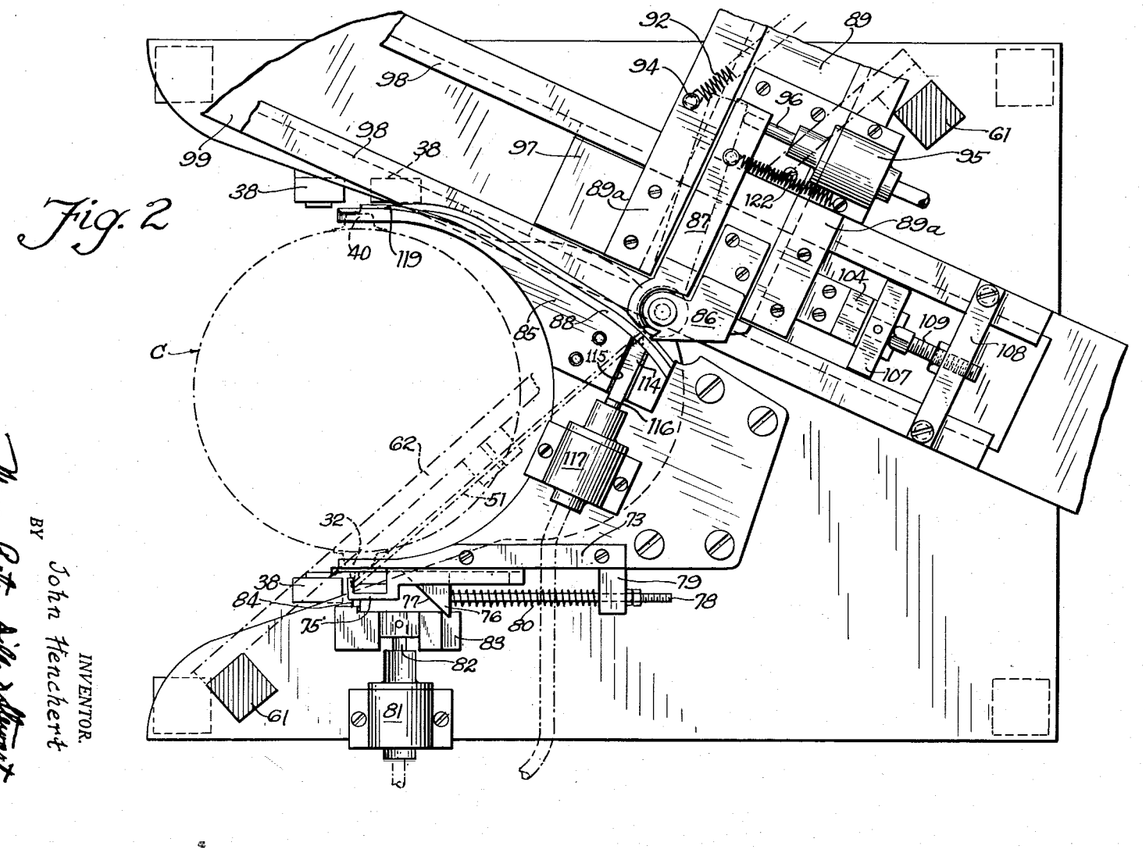
Figure 3:
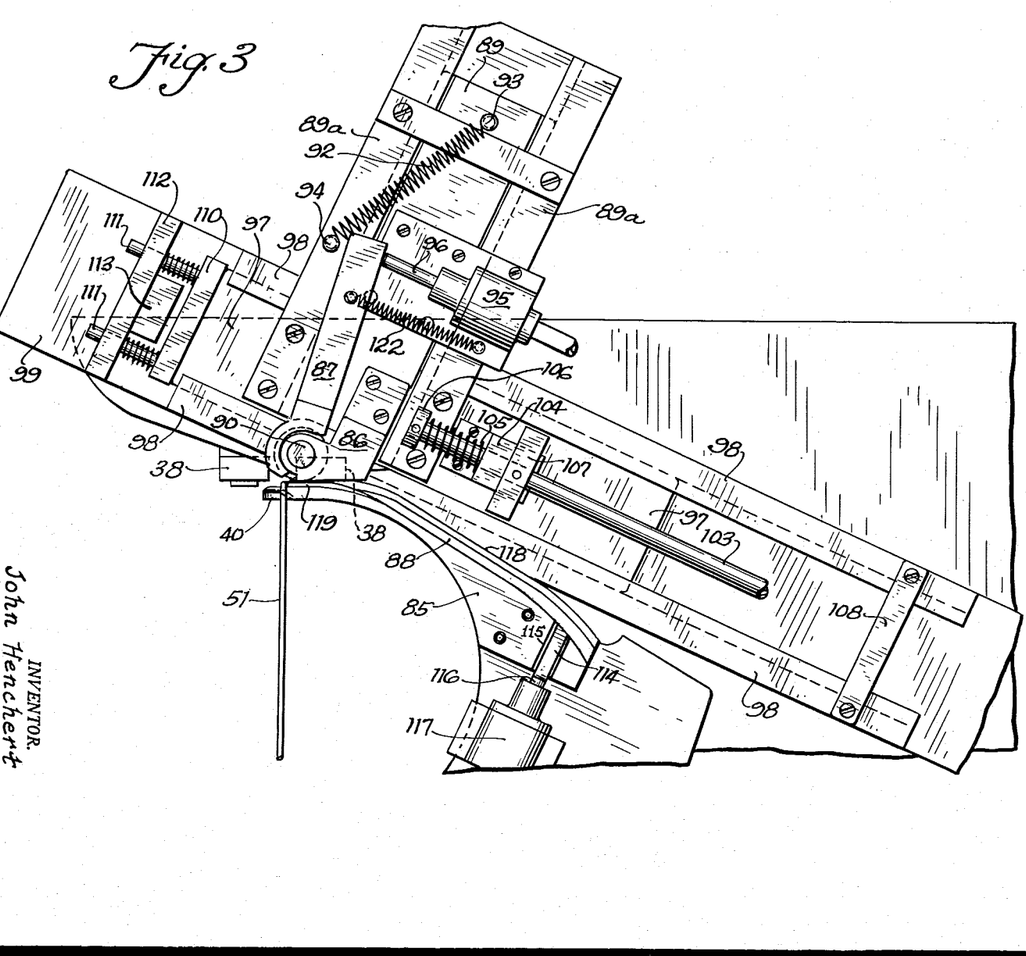
Figure 3 is a plan view of a portion of the mechanism of Figure 2 showing the bail gripping means shifted to a position for attaching the bail to the can ear.
Figure 4:
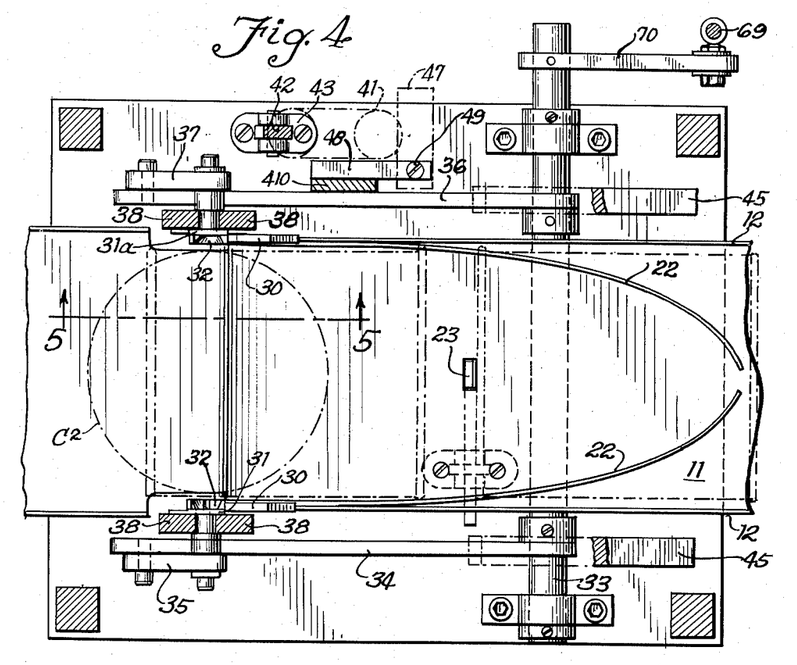
Figure 4 is a view partly in section and partly in plan on the line 4—4 of Figure 7.
Figure 5:
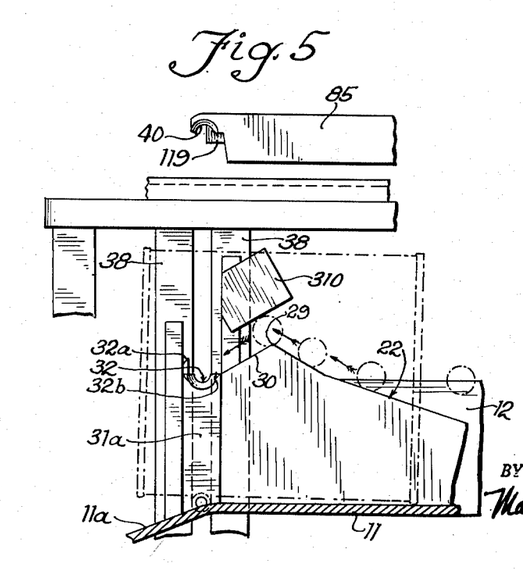
Figure 5 is a view partly in section and partly in elevation on the line 5—5 of Figure 4.
Figure 6:
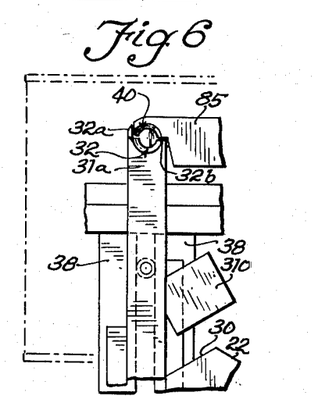
Figure 6 is a view in side elevation showing the can elevator slide in raised position.
Figure 23:
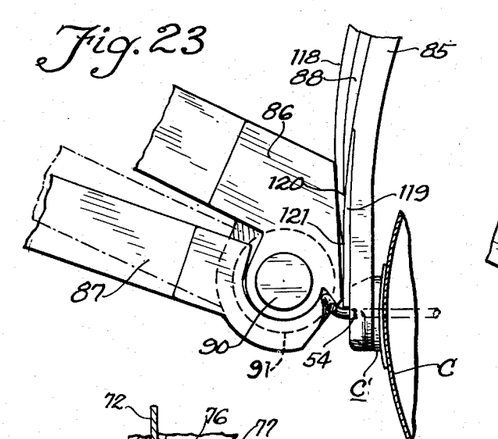
Figure 23 is a plan view showing the jaws of Figure 21 gripping the bail end and shifted to a position where the bent end of the bail is brought into alignment with the opening into the ear of the can.

Fluid pressure is now directed to the right hand end of the cylinder 100 and this will cause the carriage 97 to move to the left as viewed in Figure 1 and also as viewed in Figure 2. During this movement of the carriage, the roller 91 will be held in contact with the cam face 118 by the spring 92. This cam face 118 on the guide rail 85 is so shaped that the gripped end of the bail will be gradually moved inward as it approaches the ear. Inserted at the end of the guide rail 85 is a steel wear plate 119. The step 88 terminates at 120 and the outer face of the step merges into the outer face of the plate 119. The cam 118 terminates at 121 and the gripping jaws will press the end of the bail against the plate 119. When the bail end reaches the end of the plate 119 it will move off from said plate and into the opening in the ear as shown in Figure 23.

Figure 24:
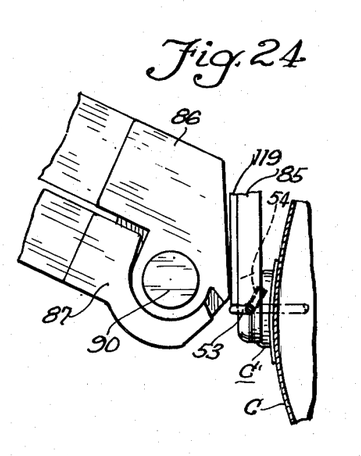
Figure 24 is a view similar to Figure 23, but showing the jaws opened and releasing the bail so that the bent end snaps into locked position.
Figure 25:
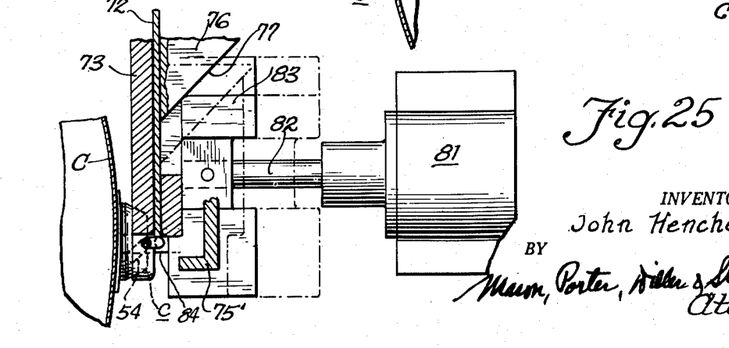
Figure 25 is a horizontal section taken on the line 25—25 of Figure 16.

Inasmuch as the portion 53 of the bail is gripped by the jaws the bent end of the bail will be held in a fixed position relative to the jaws and the bail will be twisted so that said bent end when it reaches the opening in the ear will be in alignment with the opening and can pass into the ear. The fluid pressure on the cylinder 95 is now released and the spring 122 will shift the movable jaw of the gripping devices so as to release the bail and when it is released the portion of the bail which was twisted will cause the bail to swing to the position shown in Figure 24. The bent end 54 of the bail is now in an angular position in the ear and this will lock the bail to the ear.

After the jaws have released the bail and it has entered the left ear then the bail is completely attached to the can and fluid pressure is admitted to the left hand end of the cylinder 100, the piston rod 103 is retracted and the jaws are returned to their initial position for receiving the next bail.

Referring to Figures 16 and 17, it is noted that the slide 72 is provided with a lug 123 and when this slide is moved to normal position by the spring 80 this lug 123 will contact with the bail and tilt it forwardly so as to prevent the bail from falling backwardly and catching onto the fixed bracket 73 carrying the upper ear pocket 40. As the slides are lowered by cutting off the fluid pressure on the cylinder 41 the can contacts the portion 11a of the bottom member and will slide down the same while in upright position and thus be discharged from the machine. The weight of the parts lifted are sufficient to return these can supporting slides to their initial position indicated in full lines in Figure 8 ready to receive the next can body.

Before the slides reach their lowermost position, the can body carried thereby will contact with the bottom of the can chute and the pockets will move away from the ears and the can body will be discharged along said inclined ramp 11a (see Fig. 7). As the slides move to their full retracted position, the valve 47 will be opened and this will admit fluid to the cylinder 17 and cause the feed dog to move forward and move another can body to the next station in the can chute and this, of course, will force the can body along the upwardly inclined guides 22, 22 and thence the can body moves by gravity down the inclined guides 30 into the pockets. This retracting of the slides also raises the pusher 66 to a position for engagement of the next bail. When the slides are again raised by fluid pressure admitted to the cylinder 41 the can is placed in bail attaching position and at the same time the pusher slide 66 removes the bail from the stack and places it in initial position for attachment to the can.

Figures 22, 26:
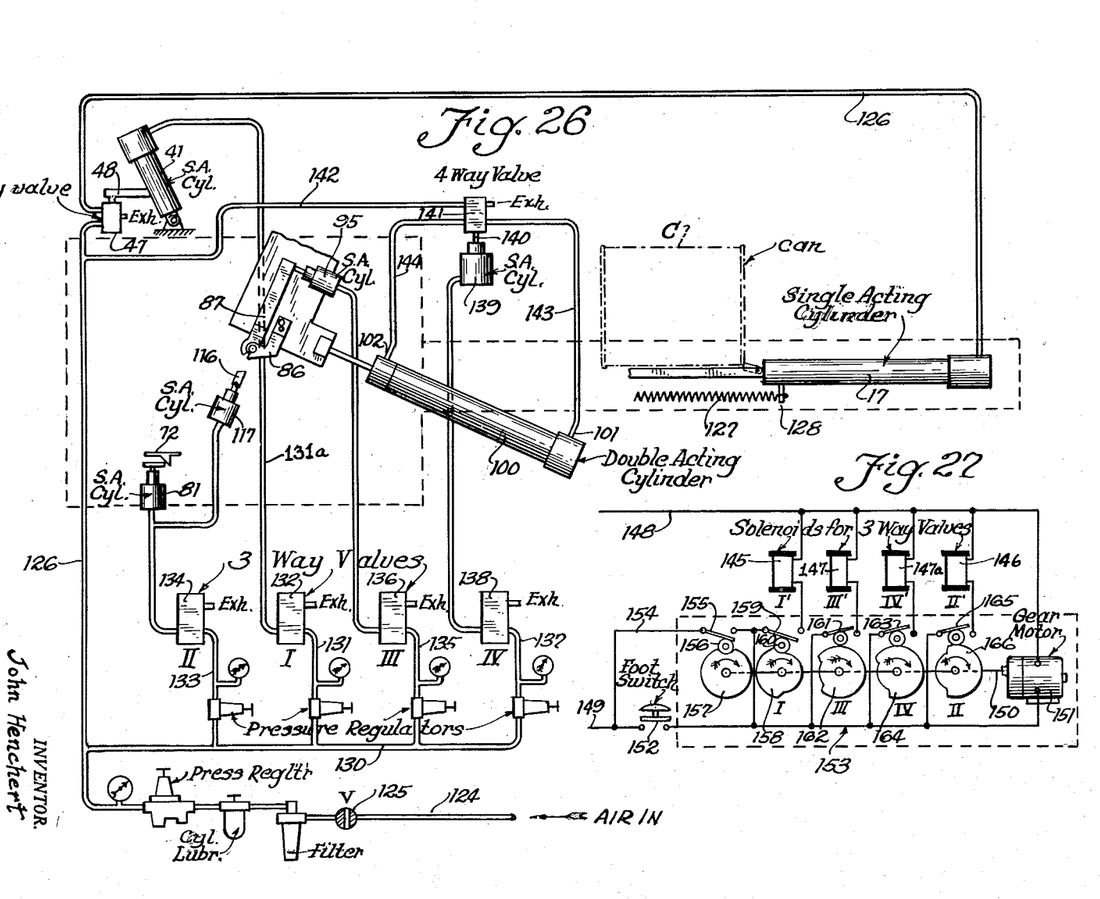
Figure 26 is a diagrammatic illustration of the various operating units and the devices for supplying fluid pressure for operating the individual units.

In Figure 26, there is shown more or less diagrammatically the arrangement of the fluid pressure supplying means and their connection to the various cylinders for operating the several units which have been described above. Air pressure is preferably used for operating the several units. The pipe 124 is connected up to any suitable supply of air under pressure. There is a valve 125 which shuts off the air when it is desired. Associated with the air supply is a filter and a pressure regulator, all of the usual form. The pipe 124 is connected to the pipe 126, which in turn is connected to the cylinder 17 through the valve 47. As this valve is opened, fluid will flow through this pipe line to the cylinder 17 and when the valve is closed it vents the line leading from the valve to the cylinder so that the piston of the cylinder is retracted by a spring 127 which is connected to a post 128 attached to the bracket 16 and the other end of the spring is connected to a post 129 attached to the extension member 26 of the piston 25.

This three-way valve 47 is operated by the arm 48 carried by the cylinder 41 which raises and lowers the can supporting slides. When the can is lowered for discharge from the machine then this arm opens the valve and permits fluid to enter the cylinder 17 and feed another can to the bail attaching position to take the place of the one which is being discharged from the machine. Just as soon as the can approaches the bail attaching position and is placed in the pockets then the slides move upwardly and at the same time the arm 48 moves away from the valve 47, and this will close off fluid supplied to the cylinder 17; also vent the cylinder so that the feed dog will be retracted ready to feed another can along the can chute.

A pipe 130 is connected to the pipe 124 and receives fluid under pressure from said pipe 124. This pipe 130 is connected to a pipe 131 which in turn is connected to the three-way valve 132. This pipe, after leaving the three-way valve is connected to the cylinder 41. This valve 132 is further identified in the drawings by I (Roman numeral). There is another pipe 133 branching off from the pipe 130 and through the valve 134 is connected to the air cylinder 81 and also the air cylinder 117. When this valve 134 is moved to open position so that fluid flows therethrough, then the pistons of the cylinders 81 and 117 will move forward and the piston of the cylinder 81 will push the right hand bail end into its ear and at the same time push the left-hand end portion of the bail into the jaws 86 and 87. This valve is also identified by the numeral II.

There is still another pipe 135 leading through the three-way valve 136 which supplies fluid pressure to the cylinder 95 for closing the jaws when the valve is set so that fluid flows freely therethrough. This valve 136 is further identified by the numeral III.

There is still another pipe 137 connected through the three-way valve 138 to an air cylinder 139. This air cylinder contains a piston 140 which is connected to the movable portion of the valve 141 which is so constructed as to reverse the fluid flow coming from the pipe 142 which in turn is connected to the pipe 126. The reversing valve is connected by a pipe 143 with the right hand end of the cylinder 100 as viewed in this Figure 26 and by a pipe 144 with the other left hand end of the cylinder. This fourway valve, when operated, will supply fluid to one end of the cylinder 100 while venting the other end, and then when the valve is shifted it will supply fluid to the opposite end of the cylinder and vent the first-named end. This valve 138 is further identified by the numeral IV. The three-way valve I is shifted in one direction by a solenoid 145, also identified by the Roman numeral I'. Associated with the valve 134 is a solenoid 146, likewise identified by the numeral II'. Associated with the valve 136 is a solenoid 147 which is further identified by the numeral III'. Associated with the valve 138 is a solenoid 147a which is identified by the numeral IV'.

The solenoids are connected in multiple through switches with the electric current supplying lines 148 and 149. Each switch is controlled by a cam. These control cams are all mounted on a shaft indicated diagrammatically at 150. The shaft is connected to a motor 151. There is a foot operated switch 152 which connects the lines 149 with the line 153 leading to the motor 151. There is another line 154 connecting the line 149 with the switch 155. There is a roller 156 associated with this switch 155 and the roller follows along the surface of the cam 157 mounted on the shaft 150. The periphery of this cam is so shaped that the motor will rotate the shaft through one revolution and then the switch 155 will open. If the foot switch is released after the switch 155 is closed, the motor will continue to operate until the switch 155 is opened.

Associated with the solenoid 145 is a cam 158. Between the solenoid and this cam 158 is a switch member 159 which is provided with a roller 160 running on the surface of the cam 158. In the position shown in Figure 27 this switch 159 is opened. As the shaft rotates and the cam turns in the direction of the arrow this switch 159 will be closed and will be held closed for a certain period of the rotation of the shaft. This will supply current to the solenoid 145 and the energizing of the solenoid will open the valve 132 for supplying fluid to the cylinder 41. When the switch is again opened by the roller passing off onto the portion of the periphery of smaller radius the current supplied to the solenoid will be cut off and the valve 132 will be closed or rather shifted to a position where the pipe line 131a will be connected to the atmosphere. There is a similar switch 161 and a control cam 162 therefor associated with the solenoid 147. There is a switch 163 and a control cam 164 therefor which supplies current to the solenoid 147a at certain times. There is a switch 165 and a control cam 166 associated therewith for supplying current to the solenoid 146. These control cams are so shaped that the operating cylinders for the various units will be supplied with fluid so as to operate in the proper sequence for feeding the can to the bail attaching station; feeding a bail to its initial position for attachment to one of the ears of the can; forcing the bent end of the right hand end of the bail into its ear and at the same time forcing the other end portion of the bail into the gripping jaws; and then shifting said other end of the bail to a position placing the bent end thereof in alignment with the opening in the left hand ear, after which the end portion will be entered into the opening and then released so that by the untwisting of the bail the bent end will be shifted so as to lock the bail to the ear of the can.

Figure 28:
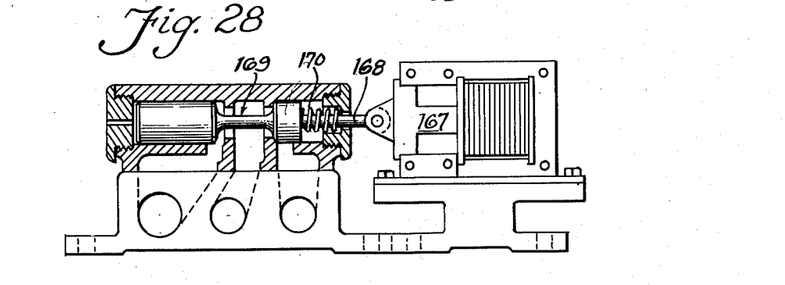
Figure 28 is a view showing one of the combined solenoid and three-way valve units.

In Figure 28 there is shown a hook-up between one of the solenoids and one of the three-way valves which is shifted thereby. In order to bring about the shifting of the valve the core 167 of the solenoid is connected to the stem 168 of the sliding valve which is indicated at 169. The spring 170 returns the valve to its initial position when the current supplied to the solenoid is cut off.

It is obvious that many changes in the details of construction may be made without departing from the spirit of the invention as set forth in the appended claims.

I claim:

1. A machine for attaching bails to the ears of the can, which bails have the ends thereof bent in opposite directions relative to the plane of the bail, comprising mechanism for positioning the ears of a can for receiving the bail ends, mechanism for positioning a bail with one bent end only in alignment with one of the ears, means for inserting said bent end in said ear, mechanism for subsequently shifting the bail to position the other end of the bail in alignment with the other ear, and means for inserting the last named bail end in said ear.

2. A machine for attaching bails to the ears of the can, which bails have the ends thereof bent in opposite directions relative to the plane of the bail, comprising mechanism for positioning the ears of a can for receiving the bent bail ends, means for initially placing a bail with one end adjacent a can ear and the bent end thereof in alignment with the ear opening and the other end at a point remotely disposed from the other ear, devices for entering said positioned bail end in its ear, and means for gripping the remotely positioned bail portion and placing the bent end thereof in alignment with the opening of the other ear and inserting the bent end in the ear.

3. A machine for attaching bails to the ears of the can, which bails have the ends thereof bent in opposite directions relative to the plane of the bail, comprising means for receiving the cans one after another and feeding the same to a bail attaching station, means operating on the bail ears for positioning the same in bail receiving position at said station, mechanism for positioning a bail with one bent end only in alignment with one of the ears, means for inserting said bent end in said ear, mechanism for subsequently shifting the bail to position the other end of the bail in alignment with the other ear, and means for inserting the last named bail end in said ear.

4. A machine for attaching bails to the ears of the can, which bails have the ends thereof bent in opposite directions relative to the plane of the bail, comprising mechanism for receiving cans one after another and feeding the same to a bail attaching station, means operating on the bail ears for supporting the can and positioning the same in bail receiving position at said station, means for initially placing a bail with one end adjacent a can ear and the bent end thereof in alignment with the ear opening and the other end at a point remotely disposed from the other ear, devices for entering said positioned bail end in its ear, and means for gripping the remotely positioned bail portion and placing the bent end thereof in alignment with the ear opening of said other ear and inserting said bent end in the ear.

5. A machine for attaching bails to the ears of the can, which bails have the ends thereof bent in opposite directions relative to the plane of the bail, comprising a can feed chute along which can bodies may be fed in an endwise direction with the bail ears at the advancing end, slides having ear receiving pockets for supporting the can by the ears, guides engaging the ears and positioning the same so as to enter said pockets, means for raising the slides to bail attaching position, means for feeding a bail, and mechanism for attaching one end of the bail to one of the ears and mechanism operating subsequently thereto for attaching the other end of the bail to the other ear.

6. A machine for attaching bails to the ears of the can, which bails have the ends thereof bent in opposite directions relative to the plane of the bail, comprising a can feed chute along which can bodies may be fed in an endwise direction with the bail ears at the advancing end, slides having ear receiving pockets, guides engaging the ears and positioning the same so as to enter said pockets, means for raising the slides to bail attaching position, means for initially placing a bail with one end adjacent a can ear and the bent end thereof in alignment with the ear opening and the other end at a point remotely disposed from the other ear, devices for entering said positioned bail end in its ear, and means for gripping the remotely positioned bail portion and shifting and twisting said bail so as to place the bent end thereof in alignment with the opening of the other ear and inserting said bent end in the ear and releasing the same to permit the bent end to turn to initial position relative to the bail.

7. A machine for attaching bails to the ears of the can, which bails have the ends thereof bent in opposite directions relative to the plane of the bail, comprising a can feed chute along which can bodies may be fed in an endwise direction with the bail ears at the advancing end, a gravity runway for feeding can bodies one after another into the feed chute, a reciprocating feed dog for feeding the can bodies along the chute, slides having ear receiving pockets, guides engaging the ears and positioning the same so as to enter said pockets, means for raising the slides to lift the can to bail attaching position, means for feeding a bail, mechanism for positioning a bail with one bent end only in alignment with one of the ears, means for inserting said bent end in said ear, mechanism for subsequently shifting the bail to position the other end of the bail in alignment with the other ear, and means for inserting the last named bail end in said ear.

8. A machine for attaching bails to the ears of the can which bails have the ends thereof bent in opposite directions relative to the plane of the bail, comprising a can feed chute along which can bodies may be fed in an endwise direction with the bail ears at the advancing end, a gravity runway for feeding the cans one after another into said chute, said gravity runway being disposed at an acute angle to the longitudinal axis of the chute so that as the can body enters the chute it will be moved endwise relative to the following can in the runway, vertically reciprocating slides having ear receiving pockets in their upper ends, guides engaging the ears and positioning the same so as to enter said pockets, means for raising the slides to lift the can to upright and bail attaching position, means for feeding a bail, and mechanism for attaching first one end of the bail to an ear and then the other end of the bail to the other ear.

9. A machine for attaching bails to the ears of the can, which bails have the ends thereof bent in opposite directions relative to the plane of the bail, comprising a can feed chute along which can bodies may be fed in an endwise direction with the bail ears at the advancing end, a gravity runway for feeding the cans one after another into said chute, said gravity runway being disposed at an acute angle to the longitudinal axis of the chute so that as the can body enters the chute it will be moved endwise relative to the following can in the runway, vertically reciprocating slides having ear receiving pockets in their upper ends, guides engaging the ears and positioning the same so as to enter said pockets, means for raising the slides to lift the can to upright and bail attaching position, means for initially placing a bail in one end adjacent the can end and the bent end thereof in alignment with the ear opening and the other end at a point remotely disposed from the other ear, means for entering said positioned bail end in its ear and means for gripping the remotely positioned bail portion and shifting and twisting said bail so as to place the bent end thereof in alignment with the opening of the other ear and inserting said bent end in the ear and then releasing the same.

10. A machine for attaching bails to the ears of the can, which bails have the ends thereof bent in opposite directions relative to the plane of the bail, comprising mechanism for positioning the ears of a can for receiving the bent bail ends, means for initially placing a bail with one end adjacent a can ear and the bent end thereof in alignment with the ear opening and the other end at a point remotely disposed from the other ear, devices for entering said positioned bail end in its ear, gripping jaws for receiving the remotely positioned bail portion and mechanism for shifting said jaws while gripping the bail so as to place the bent end thereof in alignment with the opening of the other ear, and inserting the bent end in the ear and then releasing the same.

11. A machine for attaching bails to the ears of the can, which bails have the ends thereof bent in opposite directions relative to the plane of the bail, comprising mechanism for positioning the ears of a can for receiving the bent bail ends, means for initially placing a bail with one end adjacent a can ear and the bent end thereof in alignment with the ear opening and the other end at a point remotely disposed from the other ear, devices for entering said positioned bail end in its ear, gripping jaws for receiving the remotely positioned bail portion, means for positively inserting the bail portion in the gripping jaws, means for closing the jaws, and means for shifting the gripping jaws so as to place the bent end of the bail in alignment with the opening of the other ear, and inserting the bent end in the ear and then releasing the same.

12. A machine for attaching bails to the ears of the can, which bails have the ends thereof bent in opposite directions relative to the plane of the bail, comprising mechanism for positioning the ears of a can for receiving the bent bail ends, means for initially placing a bail with one end adjacent a can ear and the bent end thereof in alignment with the ear opening and the other end at a point remotely disposed from the other ear, devices for entering said positioned bail end in its ear, gripping jaws for receiving the remotely positioned bail portion, a carriage on which said jaws are mounted, a guide rail extending along the path of movement of the carriage, said guide rail having a cam face, said carriage having a roller engaging cam face, a spring for moving the jaws and holding the roller against the cam face, means for positively inserting the bail end in the jaws, means for closing the jaws and means for moving the carriage so as to place the bent end of the bail in alignment with the opening of the other ear and inserting said bent end in the ear and releasing the same to permit said bent end to turn to initial position relative to the bail.

13. A machine for attaching bails to the ears of the can which bails have the ends thereof bent in opposite directions relative to the plane of the bail comprising a pneumatic operative mechanism for feeding a can into bail ear receiving pockets, a pneumatic operative mechanism for raising the pockets to place the ears in bail receiving position and for placing a bail with one bent end in initial ear entering position, a pneumatic operative mechanism for entering said positioned end in its ear and for positioning the other end portion of the bail in gripping jaws, a pneumatic operative mechanism for closing said jaws, a pneumatic operative mechanism for shifting the gripping jaws and the bail for placing the other bent end of the bail in its ear and then releasing the jaws, and cam controlled valves for causing said pneumatic operative mechanisms to operate in the sequence stated.

14. A machine for attaching bails to the ears of the can which bails have the ends thereof bent in opposite directions relative to the plane of the bail comprising a pneumatic operative mechanism for feeding a can into bail ear receiving pockets, a pneumatic operative mechanism for raising the pockets to place the ears in bail receiving position and for placing a bail with one bent end in initial ear entering position, a pneumatic operative mechanism for entering said positioned end in its ear and for positioning the other end portion of the bail in gripping jaws, a pneumatic operative mechanism for closing said jaws, a pneumatic operative mechanism for shifting the gripping jaws and the bail for placing the other bent end of the bail in its ear and then releasing the jaws, and cam controlled solenoid operated valves for causing said pneumatic mechanisms to operate in the sequence stated.

15. In a machine for attaching bails to the ears of cans and wherein is provided a bail attaching station, means at said station for attaching the bails to the can ears, and means for presenting the cans at said station with their ears in transverse alignment and supported solely by their ears, said last named means including a pair of vertically reciprocable support members having aligned pockets therein, means to feed cans to said members with the ears thereof overlying said pockets, and means to vertically reciprocate said members between a can receiving position in which the cans are received with their ears overlying said pockets, and a can supporting position in which said members support the cans solely by their ears at the bail attaching station.

16. In a machine for attaching bails to the ears of cans and wherein is provided a bail attaching station, means at said station for attaching the bails to the can ears, means for presenting the cans at said station with the ears in transverse alignment, said last named means including a chute extending in a generally horizontal direction toward the bail attaching station, means for feeding the cans along the chute in the direction of the axis of the cans, a guide member overlying the chute and having a can ear diverting edge portion effective as cans are moved longitudinally in the chute to divert laterally any can ear engaging therewith, and side guides including upwardly and forwardly inclined guide edge portions effective to engage can ears in a manner for bringing them into transverse alignment, and receiving portions curving below and partially about cans in the chute to receive advancing can ears and present them to said inclined guide edge portions, and in which there is included a gravity runway over which cans roll one after another onto the chute, and a diverter for shifting each can endwise as it moves onto the chute to displace the ears thereof out of alignment with the ears on the cans in said runway.

17. In a machine for attaching bails to the ears of cans and wherein is provided a bail attaching station, means at said station for attaching the bails to the can ears, and means for presenting the cans at said station with their ears in transverse alignment and supported solely by their ears, said last named means including a pair of vertically reciprocable support members having aligned pockets therein, means to feed cans to said members with the ears thereof overlying said pockets, and means to vertically reciprocate said members between a can receiving position in which the cans are received with their ears overlying said pockets, and a can supporting position in which said members support the cans solely by their ears at the bail attaching station, a chute extending in a generally horizontal direction toward the bail attaching station, means for feeding the cans along the chute in the direction of the axes of the cans, guide means engageable by the can ears as the cans are fed longitudinally to place the cans with their ears in transverse alignment, a gravity runway over which cans roll one after another onto the chute, and a diverter for shifting each can endwise as it moves onto the chute to displace the ears thereof out of alignment with the ears on the cans in said runway.

JOHN HENCHERT.

REFERENCES CITED

The following references are of record in the file of this patent:

UNITED STATES PATENTS

| Number | Name | Date |
|---|---|---|
| 1,403,169 | Kenny | Jan. 10, 1922 |
| 1,435,336 | Russel | Nov. 14, 1922 |
| 1,575,037 | Chalmers et al. | Mar. 2, 1926 |
| 1,947,472 | Hoover | Feb. 20, 1934 |
| 1,999,192 | Holloway | Apr. 30, 1935 |
| 2,154,071 | Gorman | Apr. 11, 1939 |
| 2,268,117 | Gorman | Dec. 30, 1941 |